(12) United States Patent
Wang

(10) Patent No.: US 9,242,404 B2
(45) Date of Patent: Jan. 26, 2016

(54) METHOD FOR MANUFACTURING FOAM SAFETY CONES

(71) Applicant: Wen-Ping Wang, Taichung (TW)

(72) Inventor: Wen-Ping Wang, Taichung (TW)

( * ) Notice: Subject to any disclaimer, the term of this patent is extended or adjusted under 35 U.S.C. 154(b) by 158 days.

(21) Appl. No.: 14/182,920

(22) Filed: Feb. 18, 2014

(65) Prior Publication Data

US 2015/0231819 A1 Aug. 20, 2015

(51) Int. Cl.
*E01F 9/012* (2006.01)
*B29C 53/36* (2006.01)
*B26D 3/28* (2006.01)
*B29C 44/44* (2006.01)
*B29C 44/58* (2006.01)
*B29C 65/00* (2006.01)
*B32B 3/12* (2006.01)
*B32B 38/00* (2006.01)
*B29L 22/00* (2006.01)
*B32B 38/04* (2006.01)

(52) U.S. Cl.
CPC . *B29C 53/36* (2013.01); *B26D 3/28* (2013.01); *B29C 44/44* (2013.01); *B29C 44/583* (2013.01); *B29C 66/4322* (2013.01); *B32B 3/12* (2013.01); *B32B 38/0004* (2013.01); *E01F 9/0122* (2013.01); *B29L 2022/00* (2013.01); *B32B 2038/045* (2013.01); *Y10T 156/1059* (2013.01)

(58) Field of Classification Search
CPC ......... E01F 9/011; E01F 9/012; E01F 9/0122; B29C 44/02; B29C 44/44; B29C 44/58; B29C 44/583; B29C 53/36; B29C 53/38; B29C 53/382; B29C 53/40; B29C 66/4322; B29C 66/4324; B29C 66/4326; B29C 66/4329; B29C 2793/009; B26D 3/006; B26D 3/008; B26D 3/28; B32B 3/12; B32B 5/32; B32B 38/0004; B32B 38/04; B32B 2038/045; Y10T 56/1059
See application file for complete search history.

(56) References Cited

U.S. PATENT DOCUMENTS 5,225,254 A * 7/1993 Foulke ................. E01F 9/0122 116/63 C
7,677,831 B2 * 3/2010 Kulp ..................... E01F 9/0122 116/63 C

* cited by examiner

*Primary Examiner* — Michael Tolin
(74) *Attorney, Agent, or Firm* — Muncy, Geissler, Olds & Lowe, P.C.

(57) ABSTRACT

A method of manufacturing foam safety cones utilizes a foam mold to form a plate having several concave holes on the upper surface thereof. The plate thus formed is then taken out of the mold and cut horizontally into an upper plate and a lower plate. The cutting surface goes through the upper edge of the bottoms of the concave holes, so that the upper plate has a mesh shape. The upper plate is further cut into an expanding surface, which is then folded to form a pillar object. Finally, a base is connected to the bottom of the pillar object to render a foam safety cone.

9 Claims, 6 Drawing Sheets

METHOD FOR MANUFACTURING FOAM SAFETY CONES

BACKGROUND OF THE INVENTION

1. Field of Invention

The invention relates to a method of manufacturing safety cones and, in particular, to a method of manufacturing foam safety cones.

2. Related Art

Safety cones used on roads or for the purpose of warning are made of PVC or rubber. However, due to the soaring crude oil price in recent years, the related plastic materials also become more expensive. Therefore, how to reduce the cost of manufacturing safety cones has become the topic priority of vendors. To reduce the production cost, one usually makes the base using recycled materials or some other materials. Since the primary conic body is still made of expensive materials such as PVC or rubber, the cost cannot be effectively decreased.

Moreover, the conventional safety cone consists of a conic body and a base. However, in practice, the conic body has a larger cross section. When a vehicle goes by the safety cone or a gusty wind blows by, the safety cone is very likely to be displaced or tumble due to the side wind.

It is an objective of the invention to solve the above-mentioned problems.

SUMMARY OF THE INVENTION

An objective of the invention is to provide a method of manufacturing foam safety cones to greatly reduce the production cost and to render a product that is resistant to side winds.

To achieve the above-mentioned objective, the disclosed method includes the following steps: a. Use a foam mold to make a plate. The plate is formed with several non-penetrating concave holes on the upper surface thereof. A rub part is formed between adjacent concave holes.

b. Take the plate thus formed out of the foam mold. Cut the plate along a horizontal line into an upper plate and a lower plate. The cutting surface goes through the upper edge of the bottoms of the concave holes, so that the upper plate has a mesh formed by the ribs.

c. Cut the upper plate into an expanding surface that can be folded into a predetermined pillar object. Both sides of the expanding surface are formed with connecting sides.

d. Fold the expanding surface and let the connecting sides connect together, thereby forming a predetermined pillar object.

e. Connect a base to the bottom of the pillar object, thus rendering a foam safety cone.

Preferably, the foam mold consists of an upper mold and a lower mold. The interior of the foam mold has a forming space. The inner edge of the upper mold is provided with several forming posts extending downward.

Preferably in step c, the upper plate is cut into a sector expanding surface to be folded into a conic pillar object.

Preferably in step d, the connecting sides are connected by glue so that the upper plate encloses to form a three-dimensional pillar object.

Preferably in step e, the end surface of the base to connect to the pillar object is formed with a connecting hole whose shape corresponds to the bottom of the pillar object. The bottom of the pillar object is then inserted in the connecting hole. Glue is applied between the connecting hole and the bottom of the pillar object, thereby combining the base and the pillar object.

Preferably in step e, the bottom of the pillar object is further folded outward to form a bottom edge with an expanding ring. The base consists of three stacked base boards. The base is adhered to the upper and lower surface of the bottom edge of the pillar object using the bottom boards on the upper and lower sides thereof, thereby combining the base and the pillar object.

Preferably in step a, a predetermined number of base plates are stacked to form a foam base material, which is then placed in the foam mold. The foam base material contains an inner layer consisting of several stacked base plates and a pattern layer stacked on the outermost side of the inner layer. During the foam molding process, the pattern layer is merged and integrated onto the inner layer.

Moreover, the pattern layer consists of a number of pattern base blocks with a color different from the inner layer. The pattern base blocks have a long stripe shape and are disposed on the end surface of the outermost side of the inner layer, in a regular pattern of skewed stripes with intervals.

Furthermore, a spacer base block with the same color as the inner layer is inserted between each adjacent two pattern base blocks. The spacer base blocks and the pattern base blocks form a planar pattern layer.

BRIEF DESCRIPTION OF THE DRAWINGS

These and other features, aspects and advantages of the invention will become apparent by reference to the following description and accompanying drawings which are given by way of illustration only, and thus are not limitative of the invention, and wherein.

DETAILED DESCRIPTION OF THE INVENTION

The present invention will be apparent from the following detailed description, which proceeds with reference to the accompanying drawings, wherein the same references relate to the same elements.

Figure 1:
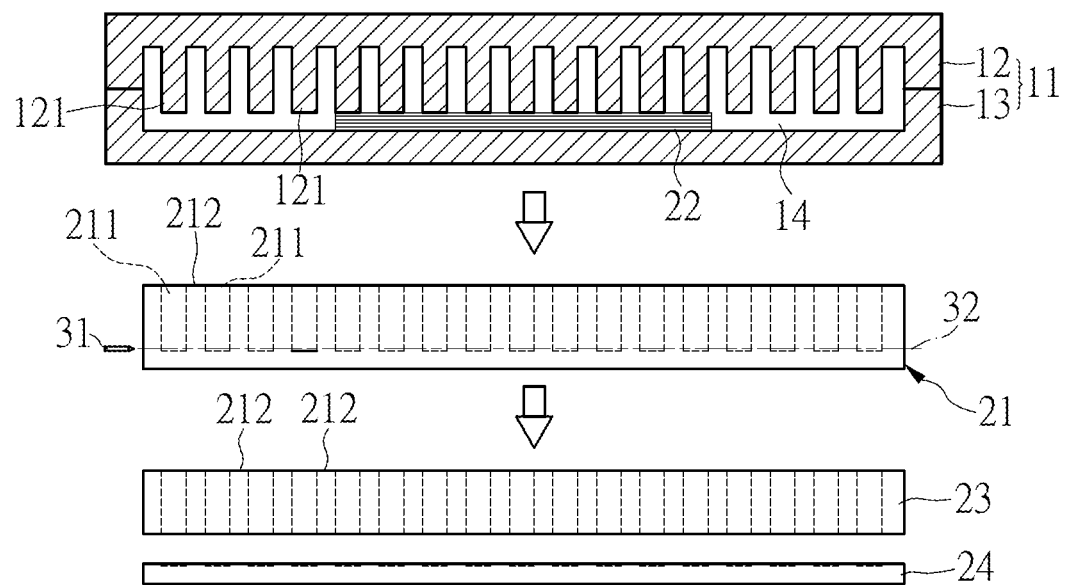
FIG. 1 is a schematic view of the manufacturing process of steps a and b according to the first embodiment of the invention.
Figure 2:
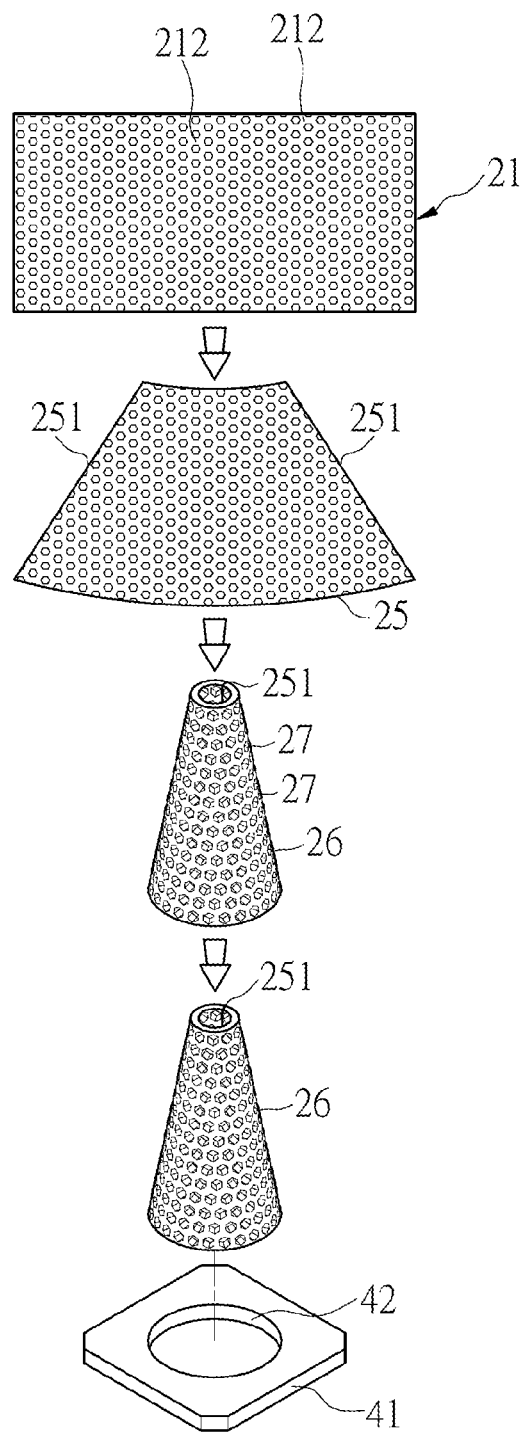
FIG. 2 is a schematic view of the manufacturing process of steps c, d and e according to the first embodiment of the invention.
Figure 3:
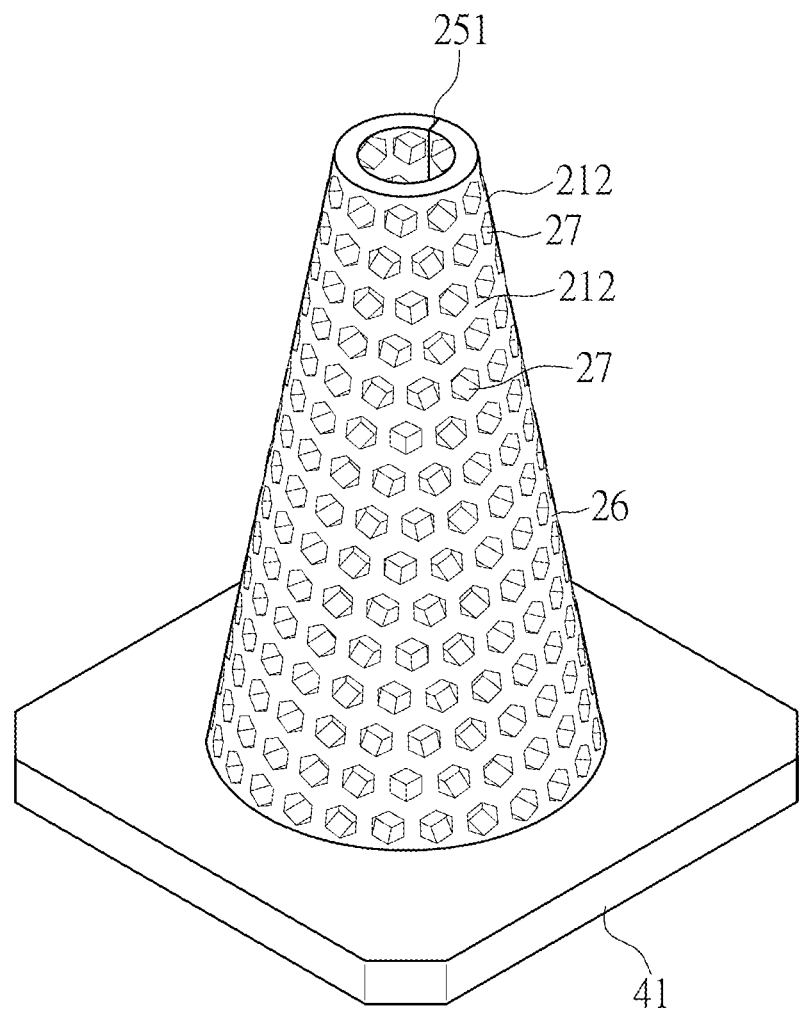
FIG. 3 is a schematic view of the product according to the first embodiment of the invention.

Please refer to FIGS. 1 to 3 for a first embodiment of the disclosed method of manufacturing foam safety cones. The method includes the following steps.

a. Foam formation. As shown in FIG. 1, a form mold 11 is used to prepare a board 21. The foam mold 11 consists of an upper mold 12 and a lower mold 13 connected together. The interior of the foam mold 11 has a molding space in a flat square shape. The inner edge of the upper mold 12 has several molding pillars 121 extending downward. A predetermined number of base plates are stacked to form a foam base 22. The foam base 22 is disposed inside the molding space 14 of the foam mold 11 for heating and foaming. This process produces a board 21 of the flat square shape. During the foam molding process of the board 21, the molding pillars 121 on the inner edge of the upper mold 12 form several non-penetrating concave holes 211 on the upper surface of the board 21. Each pair of adjacent concave holes 211 are separated by a rib 212.

b. Horizontal cut. The foam molded board 21 is taken out of the foam mold 11. A knife 31 is employed to cut the board 21 horizontally along a cutting line 32, dividing the board 21 into an upper board 23 and a lower board 24. The cutting line 32 horizontally goes through the upper edge of the bottom of the concave holes 211 of the board 21. The upper board 23 thus obtained has a mesh pattern formed by the ribs 212 after the cut.

c. Cutting. As shown in FIG. 2, the upper board 23 consisting of the ribs 212 is cut into an expanding surface 25 that can be folded into a predetermined pillar object. In this embodiment, the upper board 23 is cut into a sector expanding surface that can be folded into a conic pillar object. At least both sides of the expanding surface 25 are formed with a connecting side 251, respectively.

d. Folding. The sector expanding surface 25 is folded. The connecting sides 251 are glued together. The upper board 23 encloses to form a conic pillar object 26, which becomes the main body of the safety cone.

e. Base assembly. Finally, a base 41 is connected to the bottom of the conic pillar object 26, thus completing a foam safety cone with the base 41. In this embodiment, the base 41 has a connecting hole 42 on the end surface connecting to the conic pillar object 26. The shape of the connecting hole 42 matches that of the bottom of the conic pillar object 26, so that the bottom of the conic pillar object 26 can be inserted into the connecting hole 42. Glue is applied between the connecting hole 42 of the base 41 and the bottom of the conic pillar object 26, thereby gluing the base 41 and the conic pillar object 26 and rendering the disclosed foam safety cone (as shown in FIG. 3).

The foam safety cone prepared according to the above-mentioned fabrication method has a primary conic pillar object 26 formed from a foam material. It thus has the advantage of low cost than the conventional PVC or rubber material. Therefore, the invention can greatly reduce the manufacturing cost of the foam safety cone.

Furthermore, the surface of the disclosed foam safety cone has the ribs 212 distributed in a mesh to have several through holes 27. The through holes 27 greatly reduce the cross section of the disclosed foam safety cone under a wind. Therefore, when a vehicle passes by and produces a side wind or a gust blows by, most of air current directly passes through the through holes 27. The foam safety cone is thus less likely to be shifted or tumble. Besides, the design of through holes 27 on the surface of the foam safety cone greatly reduces the weight thereof and lowers the center of gravity closer to the ground. Thus, the invention is more stable. As a result, the thickness of the base can be properly decreased. Without increasing extra costs (e.g., hanging a weight), the invention still enjoys good stability and effectively solves the problems of easily being shifted or tumbled as in the conventional safety cones.

It should be mentioned that any person skilled in the art should know that the disclosed manufacturing method is not limited to the conic pillar object 26 in the previous embodiment. In the cutting step of the previous embodiment, one may as well cut the upper board into a shape that can be folded into a square cone or square pillar in a latter step.

Figure 4:
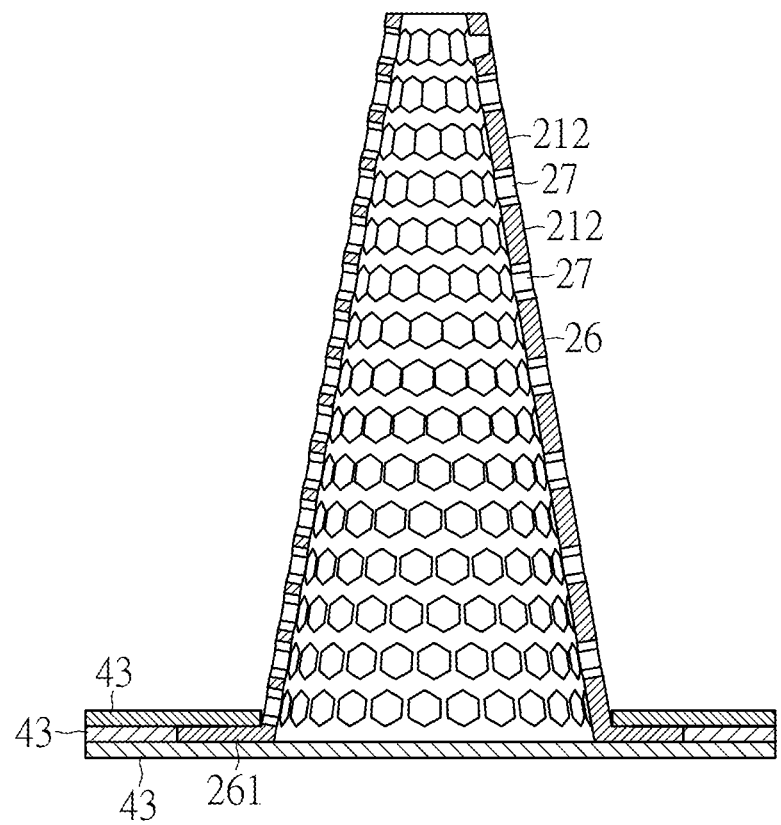
FIG. 4 is a schematic view of the disclosed structure using another base assembly method.

As shown in FIG. 4, during the step of base assembly, the bottom of the conic pillar object 26 is folded outward to form an expanding bottom rim 261. The base 41 consists of three base boards 43 stacked in sequence. The based 41 is glued to the upper and lower surfaces of the bottom rim 261 of the conic pillar object 26 via the pinching of the upper and lower base boards 43. Similarly, the base 41 and the conic pillar object 26 in this case can be connected to render the disclosed foam safety cone.

Figure 5:
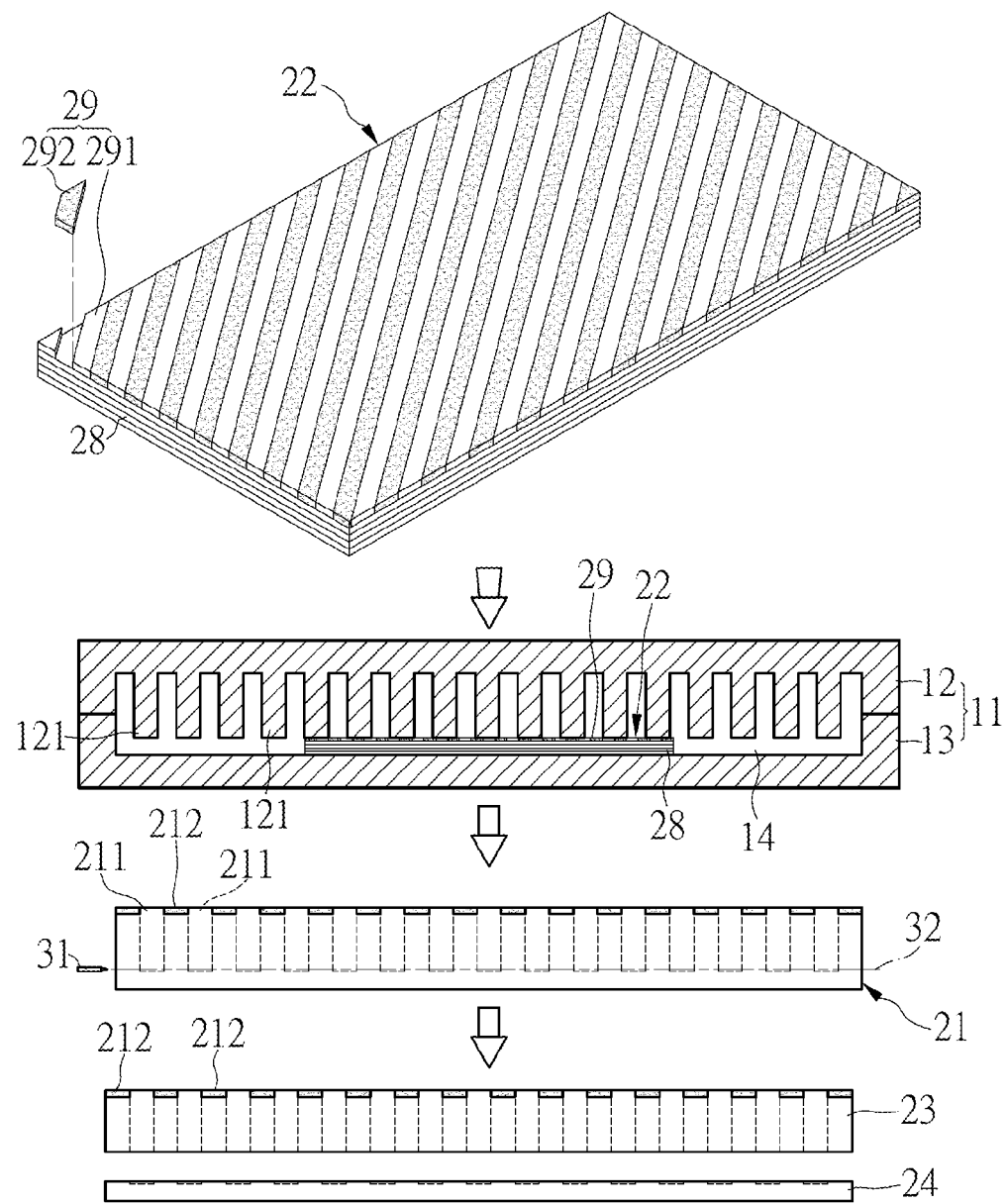
FIG. 5 is a schematic view of the manufacturing process of steps a and b according to the second embodiment of the invention.

Please refer to FIG. 5 for a second embodiment of the invention. This embodiment differs from the first embodiment in that the foam base 22 used in the step of foam molding contains an inner layer 28 consisting of several base plates stacked together and a pattern layer 29 stacked onto the outermost side of the inner layer 28. In this embodiment, the pattern layer 29 is comprised of several pattern base blocks 291 with a color different from the inner layer 28. The pattern base block 291 is prepared by mixing a predetermined foam material (e.g., PE, EAV) and a predetermined color dye, followed by heating and pressing, and being cut into a long stripe. The long-striped pattern base blocks 291 are disposed on the end surface of the outermost side of the inner layer, in a regular pattern of skewed stripes with intervals. A spacer base block 292 of the same color as the inner layer 28 is disclosed between each adjacent pattern base blocks 291. The pattern base blocks 291 and the spacer base blocks 292 are arranged to form a planar pattern layer 29. As shown in FIG. 5, the pattern base blocks 291 are disposed at intervals into a skewed stripe pattern on the outermost end surface of the inner layer 28. Afterwards, a foam base 22 is disposed in the foam mold 11 with the forming posts for a heating and foaming process. The pattern base blocks 291 of the pattern layer 29 and the base plates of the inner layer 28 are merged during the foaming process. In addition to several non-penetrating concave holes 211 on the upper surface of the foam molded board 21, the upper surface is further decorated with a pattern of skewed stripes.

Figure 6:
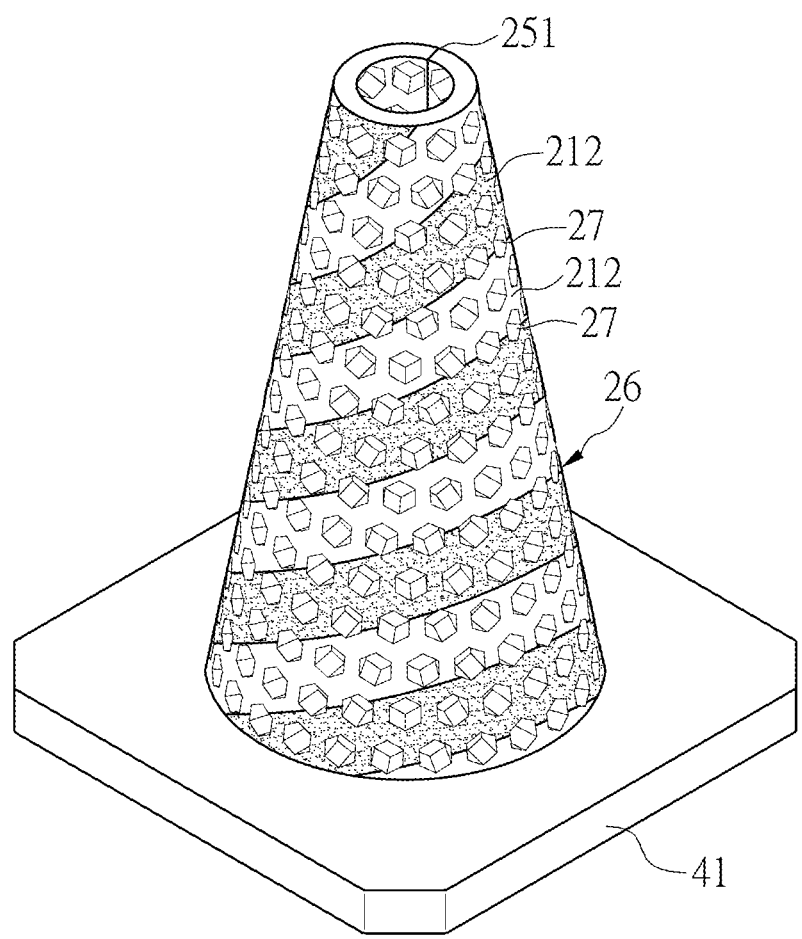
FIG. 6 is a schematic view of the product according to the second embodiment of the invention.

The manufacturing process in this embodiment is then followed by the steps of horizontal cut, cutting, and folding as in the first embodiment (as shown in FIG. 2) to render a foam safety cone. The foam safety cone thus formed is shown in FIG. 6. In addition to the several through holes 27 on the surface thereof to achieve the same effects as in the first embodiment, the step of foam molding also forms a predetermined pattern on the outer surface of the board 21. This embodiment employs a single foaming process to generate the predetermined pattern on the outer surface of the board 21, thereby effectively reducing the required time and cost for subsequent coating on the safety cone. Since the pattern thus formed is integrated during the foaming process of the pattern layer 29 and the base plate of the inner 28, it is less likely to peel off.

Although the invention has been described with reference to specific embodiments, this description is not meant to be construed in a limiting sense. Various modifications of the disclosed embodiments, as well as alternative embodiments, will be apparent to people skilled in the art. Therefore, it is contemplated that the appended claims will cover all modifications that fall within the true scope of the invention.

What is claimed is:

1. A method of manufacturing foam safety cones, comprising the steps of:
   a. using a foam mold to produce a board that is formed with a plurality of non-penetrating concave holes at least on one upper surface thereof, with a rib separating each pair of adjacent concave holes;
   b. taking the foam molded board out of the foam mold, and cutting the foam molded board along a horizontal line into an upper plate and a lower plate, with the cutting surface going through an upper edge of bottoms of the concave holes, so that the upper plate has a mesh formed by the ribs;

c. cutting the upper plate into an expanding surface to be folded into a predetermined pillar object, with at least two sides of the expanding surface being formed with a connecting side, respectively;

d. folding the expanding surface and connecting the connecting sides to form a pillar object of a predetermined shape; and e. connecting a base to a bottom of the pillar object to render a foam safety cone.

2. The method of manufacturing foam safety cones according to claim 1, wherein the foam mold consists of an upper mold and a lower mold, and has a molding space; and an inner surface of the upper mold is formed with a plurality of forming posts extending downward.

3. The method of manufacturing foam safety cones according to claim 1, wherein the upper plate is cut in step c into a sector expanding surface to be folded into a conic pillar object.

4. The method of manufacturing foam safety cones according to claim 1, wherein the connecting sides are glued together in step d so that the upper plate encloses to form a three-dimensional pillar object.

5. The method of manufacturing foam safety cones according to claim 1, wherein an end surface of the base connecting to the pillar object is formed with a connecting hole in step e, the shape of the connecting hole corresponding to that of the bottom of the pillar object; the bottom of the pillar object is inserted into the connecting hole; and a glue is applied between the connecting hole and the bottom of the pillar object to connect the base and the pillar object.

6. The method of manufacturing foam safety cones according to claim 1, wherein the bottom of the pillar object is folded outward to produce an expanding bottom rim; the base is comprised of three base boards stacked together; and the base is glued to the upper and lower surfaces of the bottom rim of the pillar object via pinching of the upper and lower base boards, thereby connecting the base and the pillar object.

7. The method of manufacturing foam safety cones according to claim 1, wherein a predetermined number of base plates are stacked to produce a foam base in step a; the foam base is disposed in the foam mold; the foam base contains an inner layer composed of stacked base plates and a pattern layer stacked onto one outermost side of the inner layer; and the pattern layer and the inner layer are integrally merged together during the foam molding process.

8. The method of manufacturing foam safety cones according to claim 7, wherein the pattern layer is comprised of a plurality of pattern base blocks with a different color from the inner layer; and the pattern block bases have the shape of a long stripe and are regularly disposed on the outermost side of the inner layer at intervals to obtain a pattern of skewed stripes.

9. The method of manufacturing foam safety cones according to claim 8, wherein a spacer base block of the same color as the inner layer is inserted between each adjacent pair of pattern base blocks, thereby forming a planar pattern layer from the pattern base blocks and the spacer base blocks.

* * * * *